T. M. CAMERON.
WINDMILL.
APPLICATION FILED JULY 29, 1918.
1,315,594.
Patented Sept. 9, 1919.
3 SHEETS—SHEET 1.
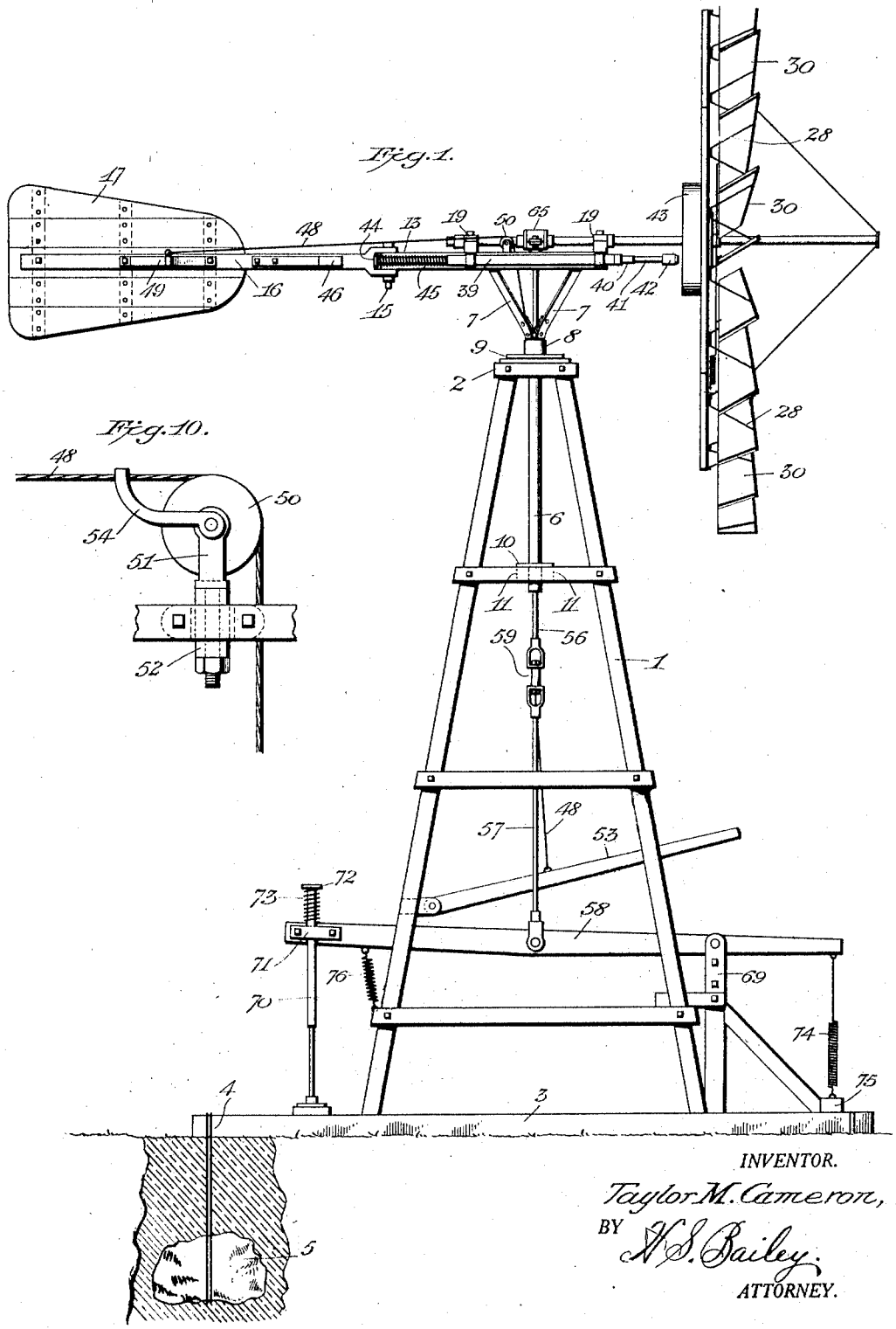
INVENTOR.
Taylor M. Cameron,
BY N. S. Bailey
ATTORNEY.

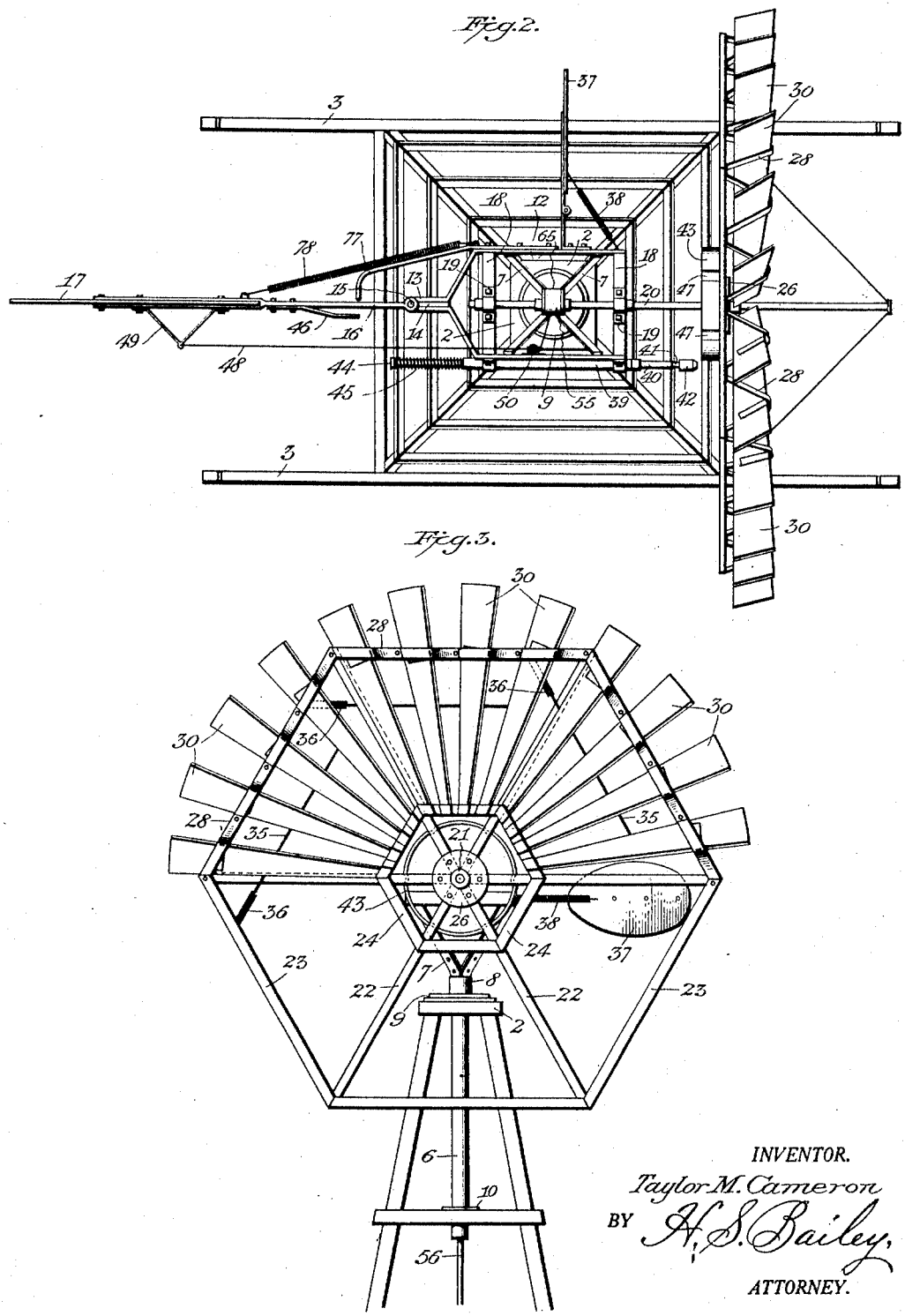

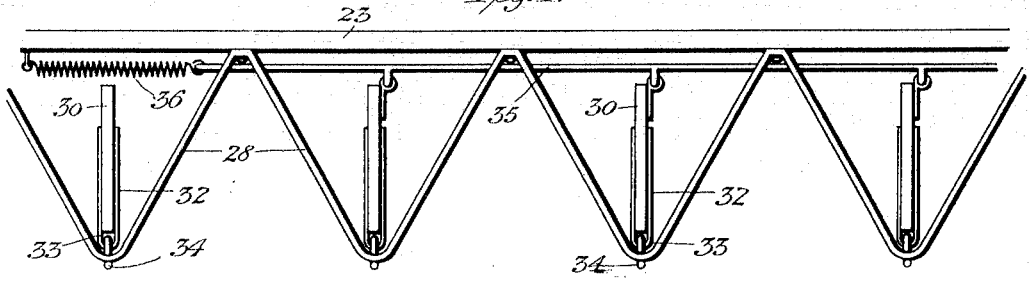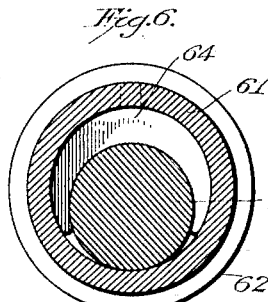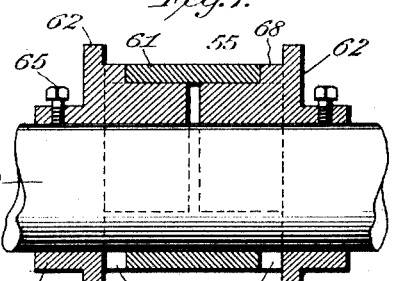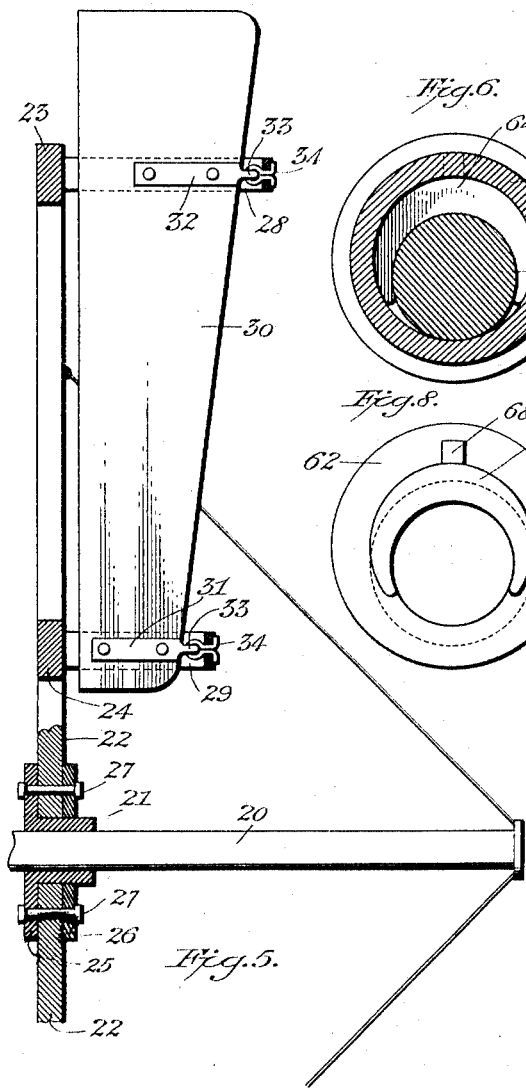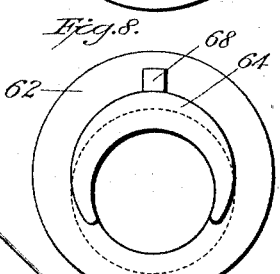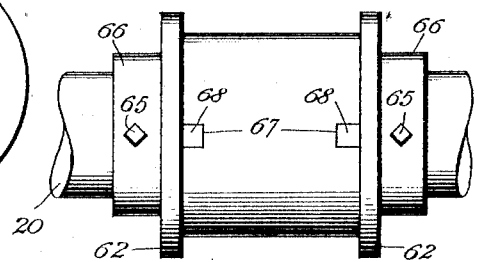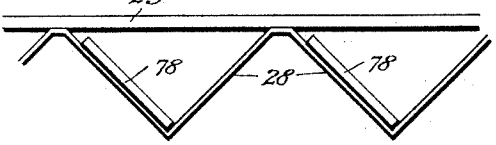

UNITED STATES PATENT OFFICE.

TAYLOR M. CAMERON, OF WRAY, COLORADO.

WINDMILL.

1,315,594.	Specification of Letters Patent.	Patented Sept. 9, 1919.

Application filed July 29, 1918. Serial No. 247,227.

*To all whom it may concern:*

Be it known that I, TAYLOR M. CAMERON, a citizen of the United States of America, residing at Wray, county of Yuma, and State of Colorado, have invented new and useful Windmills, of which the following is a specification.

This invention relates to improvements in windmills.

The object of the invention is to provide a windwheel, having hinged, spring controlled radial sails or slats, which are held under tension at a normal inclination or pitch to the wind, and which are adapted to be turned under wind of a greater than normal velocity, so as to present less resistance to the wind and thereby prevent acceleration in the speed of the wheel.

Further, to provide a wind wheel in which the inclination of the sails or slats is determined by the velocity of the wind, and the resistance of said slats to the wind is thereby automatically varied to regulate the speed of the wheel under varying wind conditions, a brake being provided to prevent rotation of the wheel, which is operated by the rudder, when the same is swung to throw the wheel out of the wind.

These and other objects are accomplished by the mechanism illustrated in the accompanying drawings, in which:

Figure 1 is a side elevation of a windmill, constructed in accordance with my invention, Fig. 2 is a plan view of the same, Fig. 3 is a front elevation of the wheel, showing the manner of connecting the sails in groups by spring controlled rods, which permit them to swing in unison under excessive wind pressure, a number of the sails being omitted, Fig. 4 is a top view of a section of the wheel showing the outer supports for the sails and the manner of hinging the sails thereto, also the manner of connecting a group of sails by a spring controlled rod, the view being in the nature of a diagram, Fig. 5 is a vertical, sectional view through a portion of the wheel, showing clearly the manner of hinging the sails to the supports, Fig. 6 is a transverse, sectional view through the eccentric which connects the power shaft with the pump rod lever, Fig. 7 is a longitudinal, vertical, sectional view through the same, Fig. 8 is an end view of one of the eccentric members, Fig. 9 is a side view of the eccentric, Fig. 10 is a side view of the sheave pulley over which the rudder operating rope passes, and Fig. 11 is a plan illustrating a modification in which the sails are secured in non-swinging engagement with the supports.

The windmill hereinafter described is of such simple design, and most of its parts can be so easily constructed, that the mill may be erected, or repairs made when necessary, by an unskilled person, thus saving the time and expense which skilled service would make necessary.

Referring to the accompanying drawings:

The numeral 1 indicates the tower which supports the wheel and other mechanism, and which comprises four corner uprights which are braced at intervals by cross bars, as shown, and which are surmounted by a cap or platform 2. At the base of the tower and on opposite sides thereof are secured stout bars or beams 3, the ends of which extend a suitable distance beyond the tower, as shown, and the ends of these bars are secured by cables 4, to anchors 5, which are embedded in the ground. These anchors may be of any suitable character, but a large piece of rock, as shown in Fig. 1, is preferable, as rock is more available than most other means of a suitable character. By this arrangement a cheap and very simple anchoring means is provided, and one which will securely hold the tower in position.

I provide a simple support for the wheel shaft, which is constructed and arranged as follows:

A piece of wrought iron tubing 6, of suitable length and diameter, is split, at one end to form four short arms, which are bent out and arms 7, are riveted thereto, in the manner shown in Figs. 1 and 2, and a collar 8, is secured around the tube at the point where the arms branch out, which serves to prevent further splitting of the tube.

The tube 6, extends down through the platform 2, and below the collar 8, is secured one member of a suitable turn table 9, the other member of which is secured to the platform. The lower end of the tube passes through a support of any suitable character that will permit the tube to turn and will at the same time hold it in vertical alinement. As illustrated, this support is simply a plate 10, through which the tube passes, and which is secured to cross bars 11.

Upon the ends of the arms 7, is bolted a frame 12, which is preferably constructed of a bar of iron which is bent to form parallel side members, which are bolted to the said arms 7, and an end member, the central portion of which is in the form of a yoke 13, in which is clamped a metal block 14, of less length than the yoke, so as to leave an eye at the outer end of the yoke to receive a bolt 15, which also passes through the forked end of an arm 16, to which the rudder 17, is secured, thus pivotally connecting the rudder with the yoke end of the frame 12, as clearly shown in Fig. 2.

The side members of the frame 12, are connected by cross bars 18, upon which are bolted bearings 19, for the shaft 20, of the wind wheel, the bearings being in line with the yoke 13, of the frame.

Upon the shaft 20, a suitable distance beyond the frame 12, is mounted the improved wind wheel, which preferably comprises a central hub 21, from which radiate arms 22, which are connected at their outer ends by bars 23, thus forming a hexagonal frame. The bars 22, are further connected a short distance from the hub, by bars 24, which form a second and much smaller hexagonal frame.

The hub 21, has a circular flange 25, and a circular apertured plate 26, of the same diameter as the flange is slipped on the hub, and the inner ends of the radial arms 22, are secured between the flange 25 and plate 26, by bolts 27, as shown in Fig. 5.

A strap iron 28, which is bent in zig-zag form, or so as to provide a number of outwardly projecting V-shaped supports, is bolted to each of the connecting bars 23, and similarly bent strap irons 29, are secured to the connecting bars 24.

In the apex of each outwardly projecting V-shaped support of the strap iron 28, are hinged the outer end portions of sails or slats 30, the inner end portions of which are hinged to the corresponding V-shaped projections of the strap irons 29.

The sails 30, may comprise boards of suitable length which taper in width toward their inner ends, and adjacent the inner and outer end portions of these sails are bolted yoke shape metal straps 31 and 32, respectively, the bent ends of which extend far enough beyond the outer edges of the sails to form eyes 33, through which are passed short rods or pieces of heavy wire 34, which form hangers, and which are bent over, as shown in Fig. 5, and their ends pass through holes in the straps 28 and 29, after which the ends are bent at right angles and in opposite directions to hold the said hangers in place. Thus the yokes 31 and 32, are pivotally connected to the hangers 34, which permit of a swinging movement of the sails. The sides of the V-shaped projections to which the sails are secured, are inclined at any desired angle, and the sails are held under tension against one side of each of the V-shaped projections, so as to present an inclined face to the wind, and this is accomplished in the following manner:

The sails are divided into six groups, corresponding to the sides of the hexagonal frame of the wind wheel, and the inner edges of the sails of each group are pivotally connected to a rod 35, in any suitable manner, and each rod is connected to one end of a contraction coil spring 36, the other end of which is attached to the frame of the wheel, as clearly shown in Figs. 3 and 4. Thus the springs 36, hold the sails under tension which will prevent their swinging under pressure of wind at average velocity; but should the wind reach a high velocity, the sails will be automatically turned away from the direction of the wind so as to present less resistance thereto, and thus automatically regulate the speed of the wheel so as not only to prevent the wheel from racing, but to cause the same to rotate at a uniform rate of speed, the inclination of the sails being determined by the force of the wind, whereby the maximum sail surface is presented, when the wind is at normal velocity, this surface being decreased in proportion to the increase of the velocity of the wind. To one side of the frame 12, is secured a bracket to which is hinged a vane 37, which lies parallel with the wheel frame, and this vane is normally held in the position shown in Fig. 2, by a contraction coil spring 38, which is secured at one end to the vane and at the other end to the frame 12. As this vane stands at right angles to the direction of the wind, and therefore receives the full force of the wind, the excessive pressure thereon turns the wheel slightly out of the wind, when the wind reaches a high velocity, the spring 38 holding the vane under resilient tension. On one side of the frame 12, is secured a tube 39, in which is slidably mounted a tube 40, which projects beyond each end of the tube 39. In the end of the tube 40, next the wind wheel, is secured a rod 41, on the outer end of which is mounted a brake block 42, which is normally out of contact with a brake band 43, secured to the spokes of the wind wheel and concentric with its axis. The opposite end of the tube 40, is provided with a collar 44, between which and the adjacent end of the tube 39, is interposed an expansion coil spring 45, which serves to normally hold the brake block 42, out of engagement with the brake band 43; but when the rudder 17, is swung around to throw the wheel out of the wind, its supporting arms 16, or rather a cushion blade spring 46, on the said arms 16, engages the end of the tube 40, and slides it through the tube 39 far enough to bring the brake block 42, into frictional engagement with the brake band 43, which brings the wheel to a standstill and holds the same against further rotation.

The face of the brake band is provided with curved depressions 47, which serve to increase the braking action through the intermittent engagement of said depressions by the brake block. The rudder is operated by a rope 48, which is secured to a bracket 49, on the rudder supporting arm 16, and which passes over a sheave pulley 50, mounted in a forked stem 51, which is pivotally mounted in a tube 52, secured to one side of the frame 12.

From the pulley 50, the rope passes through the pipe 6, and through a swivel connection to be mentioned later, to a hand lever 53, which, when depressed, is drawn on the said rope and swings the rudder to a position at right angles to that shown in Fig. 1.

Upon the pivot pin which carries the sheave wheel 50, is secured the ends of a yoke shaped member 54, which extends out over and straddles the rope 48, as shown in Fig. 10, so that when the rudder swings around, the rope 48, will engage the yoke 54, and swing the same around, thereby turning the sheave wheel in its support 52, and thus preventing the rope from slipping off the said wheel. On the wind wheel shaft 20, midway between the bearings 19, which support the same, is secured an eccentric 55, which actuates the rod that operates the pump rod lever. This lever operating rod comprises two sections, 56 and 57, the section 56, being connected to the eccentric in the usual manner, while the section 57, is connected to the pump rod lever 58, and the two sections are united by a swivel connection 59, which permits the section 56, to turn independently of the section 57, when the wind wheel revolves upon the turn table 9. The swivel 59, may be of any desired type, but as shown, it consists of stirrup like members which are secured to the opposing ends of the sections 56 and 57, and which are pivotally connected to the respective ends of a short section of pipe 60, and the rudder rope 48, passes through the pipe 60, to the lever 53.

The eccentric comprises a short section of tubing 61, of somewhat greater diameter than the shaft 20, and which is slipped on the shaft and held eccentric thereto by caps 62, in the form of circular plates, having shaft receiving holes 63, which are eccentric to the axes of the plates, and crescent like projections 64, the outer faces of which are concentric with the axes of the caps. The caps 62 are slid upon the shaft 20, on opposite sides of the tube 61, and when the crescent like projections 64, are inserted in the tube 61, as shown by Fig. 7, the tube 61, is held in a position eccentric to the shaft 20, and the caps are held in place by set screws 65, which pass through threaded apertures in hubs 66, formed on the caps, and engage the shaft, as shown. The ends of the tube 61, are each provided with one or more notches 67, into which fit projections 68, on the caps 62, thus holding the tube 61, against rotation. Should the eccentric 61, become worn in any one place, it can be easily turned to change the position of the worn part.

The pump lever 58, is pivotally mounted between uprights 69, and the operating rod 57, is connected to the lever at a point about midway between its pivotal point and its forward end, to which the pump rod 70 is attached. The pump rod is slidably mounted in a recess in the side of the lever 58, and is held in place by a plate 71, which is bolted to the side of the lever, over the recess, as shown. By this arrangement, the pump rod can be easily disconnected from the lever, should it be desired to operate the same by an ordinary hand pump. The pump rod extends above the lever 58, and has a collar 72, on its upper end, between which and the lever is interposed an expansion coil spring 73, which cushions the upward or lifting stroke of the lever 58, so that the weight of the pump rod is gradually transmitted to the lever, thus minimizing the strain on the lever and its operating rod. The weight of the pump rod causes the same to descend on the reverse stroke of the lever. The rear end of the lever extends beyond the uprights 69, and a contraction coil spring 74, is connected at one end to the extended end of the lever and at its other end to a bar 75, which is secured to the foundation timbers 3, of the tower. A contraction coil spring 76, is also connected at one end to the tower, and at its other end to the lever 58, near its forward end, and these springs being on opposite sides of the pivotal point of the lever, serve to balance or equalize the stress or tension on the same, especially at the beginning of each stroke. The spring 74, is much stronger than the spring 76, and exerts a pull on the ends of the lever 58, sufficient to materially augment the force of the lifting stroke of the said lever imparted by its actuating rod and eccentric.

A stop arm 77, is secured to one side of the frame 12, and extends out in position to engage the supporting arm 16, of the rudder 17, when the rudder swings out into the wind, to bring the wind wheel into action.

A coil spring 78, is secured at one end to the rudder supporting arm 16, and at its other end to the frame 12, and this lies against the stop arm 77, as shown in Fig. 2, and holds the rudder in line with the axis of the wind wheel. When the rope 48, is drawn upon by the lever 53, to swing the rudder around at right angles to the axis of the wind wheel, and thus throw the wheel out of the wind, the spring 78, is drawn upon and is stretched around the end of the stop arm, and is under such high tension that when the lever 53, is released the said spring 78, draws upon and swings the rudder back to the position shown in Fig. 2, where it is checked and held against further action of the spring, by the stop arm 77.

In Fig. 11 is shown a top view of a portion of said wheel, or one in which the slats are immovable. In constructing this form of wheel, the same zig-zag supports 28 and 29, are employed, and the slats 7, are rigidly bolted to one side of each of the outwardly projecting V-shaped members.

Having described my invention, what I claim as new and desire to secure by Letters Patent, is:

1. In a windmill, a wind wheel comprising a frame having an endless series of outer V-shaped supports, an inner series of similar V-shaped supports on radial lines with the outer supports, slats hinged at their outer edges in the apex portions of pairs of radially alined supports, rods connecting said slats in groups, and springs connected to the ends of said rods and said frame, for normally holding said slats against one side of these V-shaped supports.

2. In a windmill, a wind wheel comprising a hub, radial spokes extending therefrom, bars connecting said spokes to form inner and outer concentric frames, V-shaped supports on the inner and outer frames arranged in radial alinement, radial slats in said alined pairs of supports and hinged at their outer edges to the apex portions of said supports, rods pivotally connected to the inner edges of groups of said slats to move them in unison, and contraction coil springs connecting the ends of said rods and said frames, for normally holding said slats against one side of said V-shaped supports.

3. In a windmill, the combination with a tower, a frame pivotally mounted thereon, a shaft mounted on said frame, of a wind wheel on said shaft comprising a suitable frame, inner and outer radially alined V-shaped brackets secured to said frame, radial slats in alined pairs of said brackets, hinged at their outer edges in the apex portions of said brackets, rods pivotally connected to the inner edges of groups of said brackets to move the brackets of each group in unison, contraction coil springs connected at one end to said rods and at their outer ends to said frame to normally hold said slats against one side of their V-shaped brackets, and a spring controlled rudder pivotally connected to the shaft supporting frame.

4. In a windmill, the combination with a tower, of a tube pivotally mounted in the upper portion of said tower, the upper end portion of which is split to form four supporting arms, a rectangular frame secured to the upper ends of said arms, one end of which has a projecting portion formed thereon, a rudder pivotally attached to said projecting portion, a stop arm for defining the lateral swinging movement of the rudder in one direction, a spring for normally holding the rudder against movement in the other direction, a wind wheel on said shaft, a band on said wind wheel, a lever operated rope for swinging the rudder to a position at right angles to the said shaft and against the tension of its spring, and a brake slidably mounted on the frame, which is engaged by said rudder when the same is swung by said rope, and moved into frictional engagement with said band.

5. In a windmill, a shaft, a wheel thereon comprising a frame having inner and outer V-shaped brackets thereon arranged in radially alined pairs, a slat in each pair of brackets which is hinged at its outer edge to the apex portions of the brackets, said slats being arranged in groups, a rod pivotally connected to the inner edges of the slats of each group, a contraction coil spring connected at one end to each rod, and at its other end to the frame, said springs being adapted to hold the slats of each group against one side of their respective V-shaped brackets, a rotatable frame on which the shaft is mounted, a rudder hinged to said frame, and means for normally holding said rudder in line with said shaft, means for swinging the rudder to a position at right angles to the shaft, and a slidable spring controlled brake which is adapted to be operated by said rudder when so swung, to engage and stop the wheel.

In testimony whereof I affix my signature in presence of two witnesses.

TAYLOR M. CAMERON.

Witnesses:
G. SARGENT ELLIOTT,
ELIZABETH SMITH.

Copies of this patent may be obtained for five cents each, by addressing the "Commissioner of Patents, Washington, D. C."